RECORD SUPPORTING MEANS FOR RECORD CHANGING PHONOGRAPHS

Filed Aug. 23, 1950 3 Sheets-Sheet 1

INVENTOR
Henry Jones Fortune
By David J. Mosant
his atty

July 6, 1954 H. J. FORTUNE 2,683,039

RECORD SUPPORTING MEANS FOR RECORD CHANGING PHONOGRAPHS

Filed Aug. 23, 1950 3 Sheets-Sheet 2

INVENTOR
Henry James Fortune
by Day Impint
his atty

July 6, 1954 H. J. FORTUNE 2,683,039

RECORD SUPPORTING MEANS FOR RECORD CHANGING PHONOGRAPHS

Filed Aug. 23, 1950 3 Sheets-Sheet 3

INVENTOR
Henry James Fortune
By David M. ... his atty

Patented July 6, 1954 2,683,039

UNITED STATES PATENT OFFICE 2,683,039

RECORD SUPPORTING MEANS FOR RECORD CHANGING PHONOGRAPHS

Henry James Fortune, Swindon, England, assignor to The Garrard Engineering and Manufacturing Company Limited, Swindon, England Application August 23, 1950, Serial No. 180,918

3 Claims. (Cl. 274—10)

This invention relates to record supporting means or spindles for record changing phonographs and has particular reference to the supporting and releasing of records having large diameter central holes.

The object of the invention is to provide an improved support for records of the type described which is adapted for use with a phonograph having a removable stationary stepped spindle whereby the phonograph is adapted for use with long playing records having large diameter holes as well as with records having the normal small centre hole.

According to the invention, the freely removable record support is provided with a stationary upper portion incorporating record supporting and releasing means adapted to be actuated by a rotatable member extending through the stationary portion and having means for coupling it to the record change control means.

The record supporting and release means may be of known form for use with records having an inner perimeter of reduced thickness, said means incorporating radially displaceable supporting and separating means.

A lower record centralising member is provided which may comprise a cylinder adapted to seat upon and rotate with the turntable.

Figures 1, 1A:
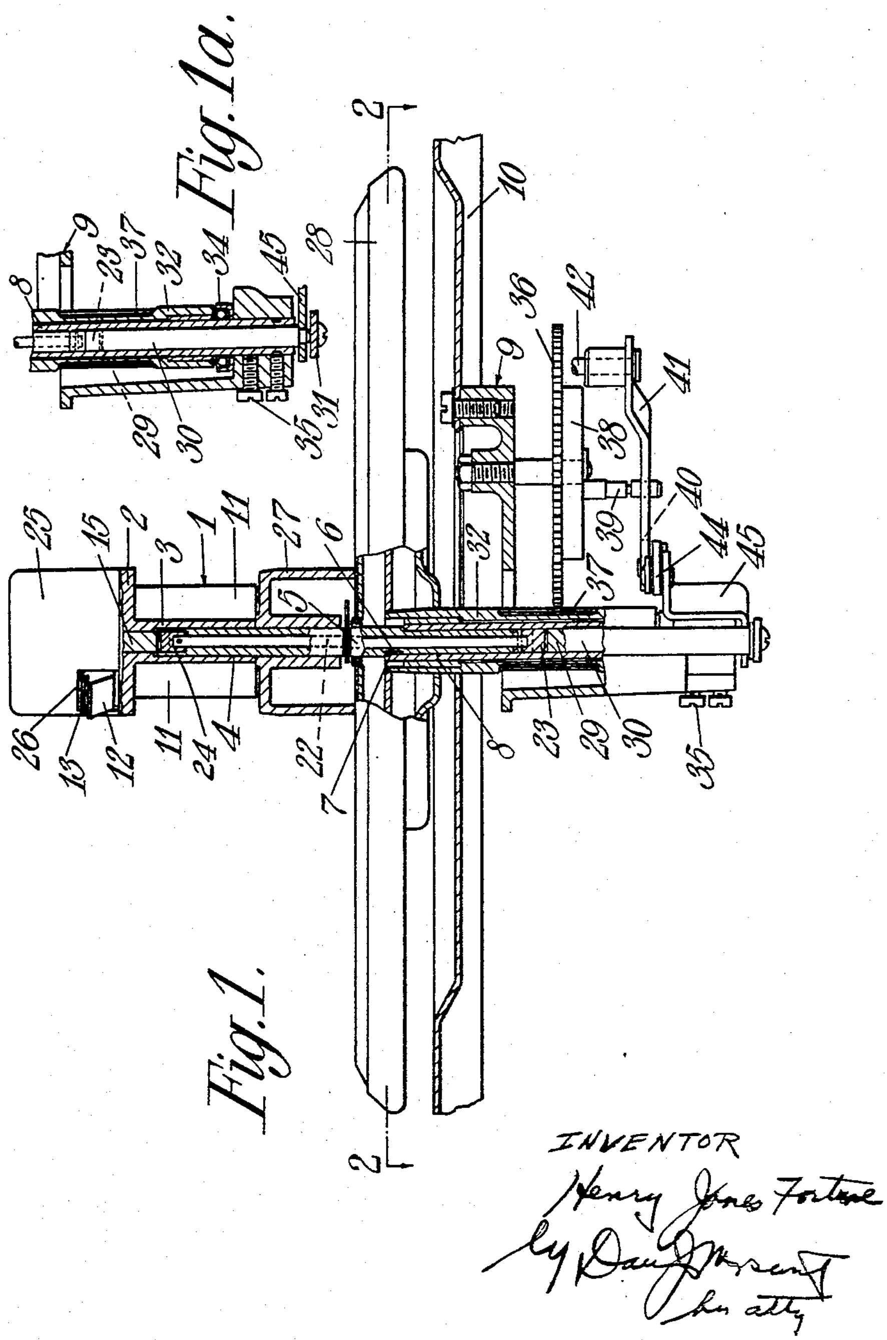
Figure 1 is an elevation in section showing the improved detachable spindle in association with parts of a phonograph record changer.
Fig. 1A is a vertical sectional view of the spindle actuating mechanism.
Figure 2:
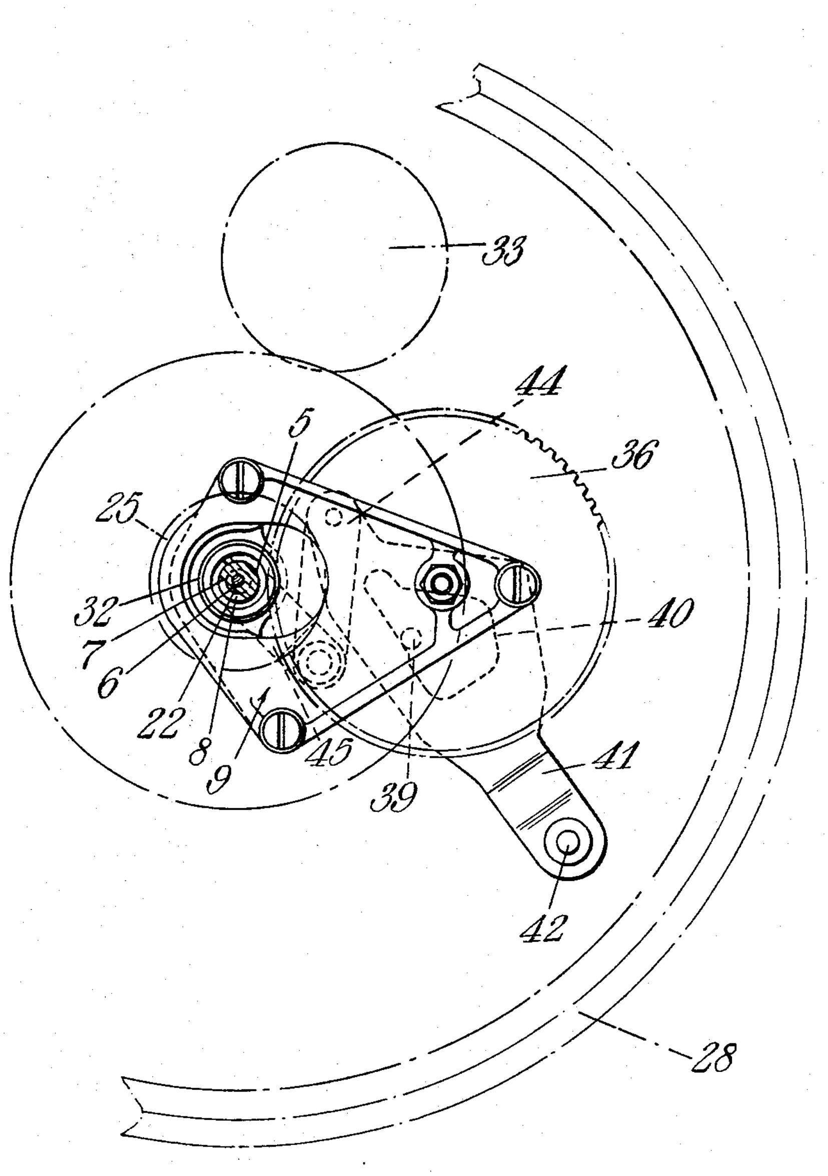
Figure 2 is a plan of the control for the delivery of records from the stack, taken on the line 2—2 of Figure 1.
Figures 3, 4:
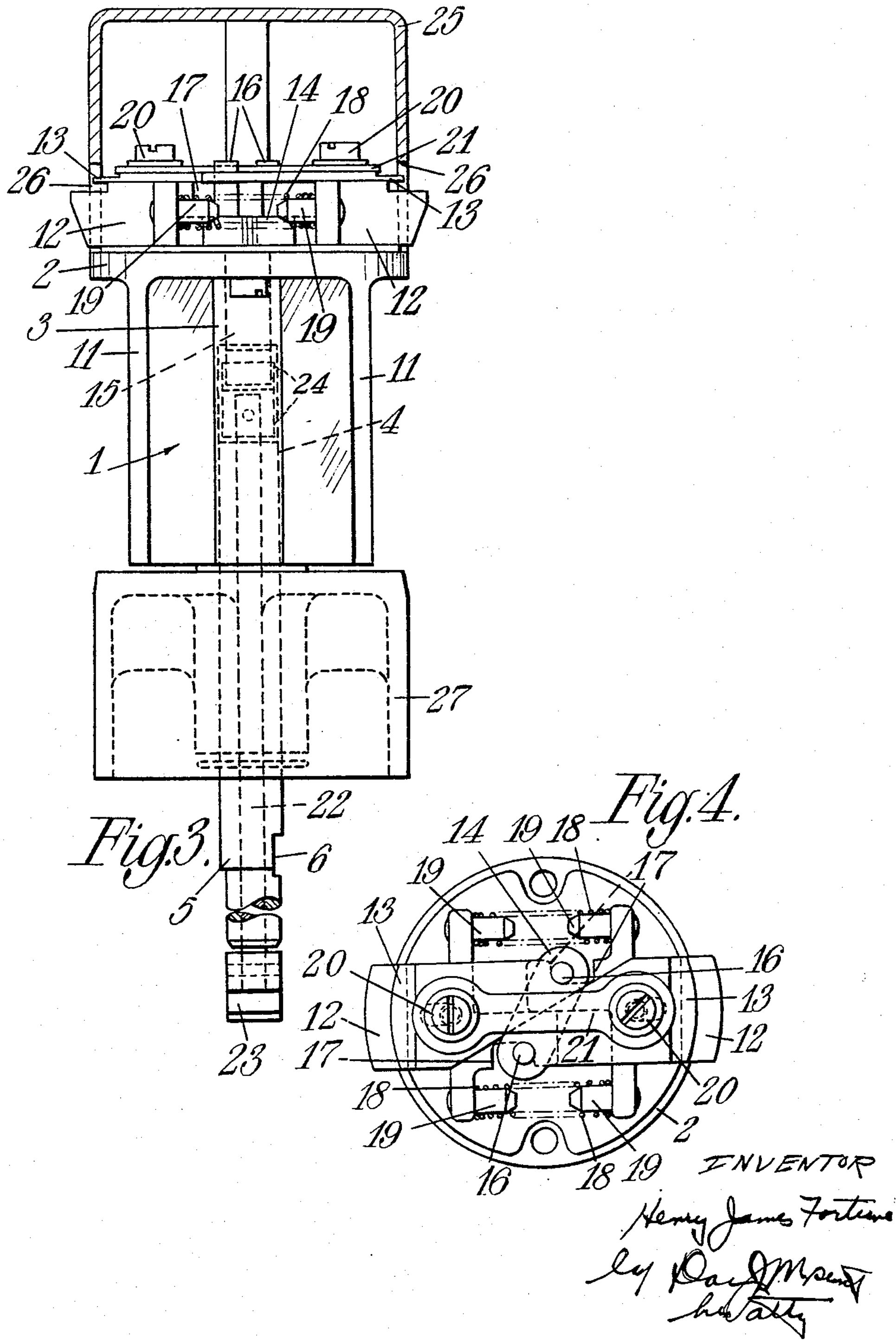
Figure 3 is an outside view of the improved detachable spindle.
Figure 4 is a plan of the spindle showing the record delivery means.

In carrying the invention into effect according to one convenient mode by way of example the record support comprises a casting 1 having an upper transverse surface or web 2 of circular form and a downward central portion or stem 3 which has an axial aperture 4 in which a downwardly extending spindle 5 is secured.

The spindle 5 is provided with a surface 6 which engages a complementary fixed surface 7 on the phonograph to prevent rotation of the spindle and the support for the stack of records.

The surface 7 is conveniently formed on a tube or sleeve 8 which is secured in a mounting 9. The mounting 9 is suspended below the motor board 10.

Radiating from the central portion 3 are fins 11, a convenient number being four at 90°, to each other. The upper surface of the web 2 forms a support for the record supporting and feeding means which comprises a pair of diametrically disposed supporting fingers 12 which normally extend beyond the edge of the transverse surface 2 and which are surmounted by a pair of thin separating means or knives 13. Both the fingers 12 and knives 13 are adapted for simultaneous radial movement in opposite directions. These movements are effected by a crank 14 mounted upon a short shaft 15 extending into the axial aperture 4 of the spindle. The crank is provided with opposed upwardly extending crank pins 16 which abut against surfaces 17 on the fingers and extend into holes in the separating knives, the arrangement being such that on turning the crank 14 the fingers 12 are drawn inwardly from their normally supporting positions while the separating knives 13 are moved outwardly. The inward movement of the fingers 12 is effected against the action of returning springs 18 which are located between the fingers 12 and guided by lugs 19 thereon. The outer margins of the upper surface of the fingers 12 are recessed to provide a space between the fingers and the separating knives 13 conforming to the thickness of the inner marginal periphery of the records.

Guiding means, comprising screws 20 and slots in the fingers and knives are provided for guiding the fingers 12 and separating knives 13 in their radial movements. The screws 20 also secure a plate 21 in position which forms, with the upper surface of web 2, a space in which the fingers 12 and knives move.

The movements of the crank 14 are effected by a shaft 22 which extends upwardly into the axial aperture 4 of the spindle 5, such shaft being provided at its lower end with a coupling surface 23 adapted to engage the slot 29 in a member 30 of the record change control means. This shaft 22 and the crank shaft 15 are provided on their adjacent ends with clutch formations 24 whereby the motions of the shaft are transferred to the crank shaft.

The record feeding and supporting fingers 12 and knives 13 are enclosed by a removable cap 25 having diametrical slots 26 through which the fingers and knives project. The height of the cap 25 is suitable to accommodate the desired stack of records and its diameter conforms to the central hole of the records.

Mounted freely on the fixed spindle 5 below the fins 11 is a cylindrical element 27 which is adapted to seat upon the turntable 28 and rotate therewith. This element 27 forms a centralising guide for the records as they are released and fall on to the turntable or a record already delivered thereto.

The member 30 is located within the sleeve 8 for oscillation therein and is supported at its lower end upon a bearing plate 31 secured to the mounting 9.

Rotatably mounted upon the sleeve 8 is a pinion spindle 32 the upper end of which is tapered to receive the turntable 28 which is driven by the driving wheel 33. At its lower end the spindle 32 seats upon a thrust bearing 34.

The fixed sleeve 8 is angularly adjustable for setting the surface 7 in the correct position and is locked when set by a screw 35.

The mounting 9 supports a rotatable control gear 36 having cams for controlling the record changing mechanism and its associated means. Such gear is adapted to be driven at the appropriate time by the pinion 37 on spindle 32.

Secured to the gear 36 is a disc 38 having a crank pin 39 which projects in the camming aperture 40 of a pivoted plate 41 which pivots about a pin 42 supported on a stationary part. The plate 41 is connected by a link 44 to a lever 45 secured to the lower end of the member 30.

The arrangement is such that upon rotation of the control gear 36, at the appropriate time in the record changing cycle, the plate 41 will be oscillated by the crank pin 39 and oscillate the member 30. The oscillation of this member 30 actuates the crank 14 and thus withdraws the fingers 12 from the lowest record in the stack, at the same time projecting the knives outwards to support those records above the lowest.

The released record falls downwardly guided by the fins 11 and the rotary cylindrical element 27 on to the turntable. The provision of the guiding fins 11 reduces the friction between such part and the records and also allows passage of air from beneath the descending record. Clearly however the fin construction may be replaced by a cylindrical or other suitably shaped formaation.

When it is desired to play records having the normal small central hole the spindle device as above described is removed and an offset bent stationary spindle inserted to engage the surface 7. When the offset spindle for small hole records is mounted in position it will be located by the surface 7 of the stationary tube or sleeve 8, the lower end of such offset spindle being spaced from the upper end of member 30.

The crank pin 39 has a dual function in that it also actuates known mechanism for feeding the lowest record from a stack when using the offset bent spindle and small centre hole records.

I claim:

1. A freely removable record support for supporting above a rotatable turntable a stack of phonograph records having large diameter central holes, comprising a hollow spindle extending through said turntable, said spindle having a diameter which is a minor fraction of the diameter of such central holes and being fixedly mounted against rotation at its lower end, said hollow spindle having at its free end a stationary portion having a diameter substantially equal to the diameter of such central holes and incorporating opposing sets of juxtaposed record supporting and releasing means and of a height substantially equal to the total thickness of the records to be played during one operation, said stationary portion being supported by said spindle in spaced relation to the turntable, a shaft mounted in said spindle for oscillation, a record changer control element detachably and operatively connected with said oscillatable shaft for periodically oscillating the same, a record centralizing member, of a diameter equal to that of said stationary portion and a height equal to that of the stack of records supportable on said stationary portion, freely mounted on said spindle in substantial vertically spaced relation to said stationary portion for rotational engagement with the turntable, circumferentially relatively narrow, vertical guide means extending from circumferentially spaced portions of the periphery of said stationary portion to said centralizing member, and means detachably and operatively connecting said oscillatable shaft respectively with said record supporting and releasing means on the stationary portion for relatively displacing said supporting and releasing means of each set when said shaft is oscillated, whereby to permit the lowermost record from the stack to drop onto the turn table in engagement with said centralizing member said circumferentially relatively narrow guide means acting as friction and air pressure relieving guides for the records during passage of the latter from said stationary portion to said centralizing member.

2. A freely removable record support for supporting above a rotatable turntable a stack of phonograph records having large diameter central holes, comprising a hollow spindle extending through said turntable, said spindle having a diameter which is a minor fraction of the diameter of such control holes and being fixedly mounted against rotation at its lower end, said spindle having at its free end a stationary portion having a diameter substantially equal to the diameter of such central holes and incorporating opposing sets of juxtaposed record supporting and releasing means, and of a height substantially equal to the total thickness of the records to be played during one operation, a shaft oscillatably mounted in said spindle, a record changer control element detachably and operatively connected with said oscillatable shaft for periodically oscillating the same, the supporting means of each set incorporating radially oppositely displaceable supporting fingers, the releasing means of each set comprising radially oppositely displaceable knives, and the fingers and knives being superposed, a crank shaft extending into said spindle and detachably coupled to said oscillatable shaft, a crank having a pair of diametrically opposed arms extending radially from said crank shaft, a pin on each arm of said crank each interengaged with a knife, and means biasing said fingers radially apart and each into abutting relation with the pin interengaged with the knife superposed on the other finger whereby, upon oscillation of said crank shaft and said oscillatable shaft, said fingers are retracted and said knives are simultaneously projected.

3. A freely movable record support for supporting above a rotatable turntable a stack of phonograph records having large diameter central holes, comprising a hollow spindle extending through said turntable, said spindle having a diameter which is a minor fraction of the diameter of such central holes and being fixedly mounted against rotation at its lower end, said hollow spindle having at its free end a stationary portion having a diameter substantially equal to the diameter of such central holes and incorporating opposing sets of juxtaposed record supporting and releasing means and of a height substantially equal to the total thickness of the records to be played during one operation, a shaft oscillatably mounted in said spindle, a record change control element detachably and operatively connected with said oscillatable shaft for periodically oscillating the same, means detachably and operatively connecting said oscillatable shaft respectively with said record supporting and releasing means on the stationary portion for relatively displacing said supporting and releasing means of each set when said shaft is oscillated, whereby to permit the lowermost record from the stack to drop onto the turntable, and wherein the stationary portion has a cylindrical periphery on its upper part incorporating the record support and release means and is provided with a series of radial fins on the lowermost part thereof below the record support and release means, and wherein a centralizing member of diameter equal to that of said stationary portion and of a height substantially equal to the total thickness of the records to be played during one operation is freely mounted on the spindle below the lower part of said stationary portion and is seated upon and rotates through frictional contact with the turntable, said fins acting as friction and air pressure relieving guides for the records during passage of the latter from said stationary portion to said centralizing member.

References Cited in the file of this patent

UNITED STATES PATENTS

| Number | Name | Date |
|---|---|---|
| 874,985 | O'Neill | Dec. 31, 1907 |
| 1,568,130 | Blackwell | Jan. 5, 1926 |

FOREIGN PATENTS

| Number | Country | Date |
|---|---|---|
| 551,388 | Great Britain | Feb. 19, 1943 |